(12) United States Patent
Blaffert et al.

(10) Patent No.: US 9,336,613 B2
(45) Date of Patent: May 10, 2016

(54) APPARATUS FOR GENERATING ASSIGNMENTS BETWEEN IMAGE REGIONS OF AN IMAGE AND ELEMENT CLASSES

(75) Inventors: Thomas Blaffert, Hamburg (DE); Steffen Renisch, Hamburg, DE (US); Bernd Schweizer, Ketsch (DE); Zhiqiang Hu, Twinsburg, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 171 days.

(21) Appl. No.: 14/117,698

(22) PCT Filed: May 23, 2012

(86) PCT No.: PCT/IB2012/052576
§ 371 (c)(1),
(2), (4) Date: Jan. 6, 2014

(87) PCT Pub. No.: WO2012/160520
PCT Pub. Date: Nov. 29, 2012

(65) Prior Publication Data
US 2014/0133728 A1    May 15, 2014

Related U.S. Application Data

(60) Provisional application No. 61/489,339, filed on May 24, 2011.

(51) Int. Cl.
*G06K 9/00* (2006.01)
*G06T 11/00* (2006.01)
*G06T 7/00* (2006.01)

(52) U.S. Cl.
CPC ............. *G06T 11/008* (2013.01); *G06T 7/0012* (2013.01); *G06T 7/0081* (2013.01);
(Continued)

(58) Field of Classification Search
None
See application file for complete search history.

(56) References Cited

U.S. PATENT DOCUMENTS 5,750,991 A    5/1998   Moyers et al.
6,310,968 B1   10/2001  Hawkins et al.
(Continued)

FOREIGN PATENT DOCUMENTS

| EP | 2161594 A2 | 3/2010 | |
|---|---|---|---|
| WO | 2009138898 A1 | 11/2009 | |
| WO | WO 2009138898 A1 * | 11/2009 | ............ G06T 11/006 |

OTHER PUBLICATIONS

Karp et al, The benefit of time of flight in PET imaging—J nucl Med 2008 49-3—462-470.*
(Continued)

*Primary Examiner* — Chan Park
*Assistant Examiner* — Iman K Kholdebarin

(57) ABSTRACT

An apparatus for generating assignments between image regions of an image of an object and element classes includes an assigning unit (13) for assigning element classes to image regions of an element image of the object, which is indicative of a distribution of the element classes, depending on region and/or boundary features, which are determined depending on image values of a provided object image and provided first preliminary assignments. Thus, the resulting element image with the assignments to the element classes is not necessarily based on the provided object image only, but can also be based on the provided preliminary assignments. If the quality of the assignments defined by the element image would be restricted due to restrictions of the provided object image, these restrictions of the provided image can therefore be compensated by the preliminary assignments such that the quality of the resulting element image can be improved.

18 Claims, 11 Drawing Sheets

(52) U.S. Cl.
CPC .............. *G06T 7/0091* (2013.01); *G06T 7/0097*
(2013.01); *G06T 2207/10088* (2013.01); *G06T 2207/10104* (2013.01); *G06T 2207/20152* (2013.01); *G06T 2207/20221* (2013.01); *G06T 2207/30004* (2013.01); *G06T 2207/30061* (2013.01)

(56) References Cited

U.S. PATENT DOCUMENTS

| | | | | |
|---|---|---|---|---|
| 7,348,564 | B2 | 3/2008 | Wollenweber et al. | |
| 7,729,467 | B2 | 6/2010 | Kohlmyer et al. | |
| 7,953,265 | B2* | 5/2011 | Sirohey | G06K 9/34 382/100 |
| 8,045,778 | B2* | 10/2011 | Blaffert | G06T 7/0012 128/922 |
| 8,787,620 | B2* | 7/2014 | Laurence | G06K 9/78 250/269.3 |
| 9,002,082 | B2* | 4/2015 | Ambwani | G01R 33/481 382/128 |
| 9,092,691 | B1* | 7/2015 | Beaumont | G06T 7/0014 |
| 2004/0258305 | A1 | 12/2004 | Burnham et al. | |
| 2007/0053491 | A1* | 3/2007 | Schildkraut | A61N 5/1049 378/65 |
| 2008/0050000 | A1* | 2/2008 | Blaffert | G06T 7/0012 382/131 |
| 2008/0267497 | A1 | 10/2008 | Fan | |
| 2009/0110256 | A1* | 4/2009 | Thielemans | A61B 6/032 382/131 |
| 2009/0123070 | A1 | 5/2009 | Xiaoying | |
| 2011/0158497 | A1* | 6/2011 | Schweizer | G01R 33/481 382/131 |
| 2011/0164801 | A1* | 7/2011 | Gagnon | G01R 33/481 382/131 |
| 2013/0315454 | A1* | 11/2013 | Laurence | G01T 1/1647 382/128 |
| 2014/0099009 | A1* | 4/2014 | Lonn | G06T 11/005 382/131 |
| 2014/0133728 | A1* | 5/2014 | Blaffert | G06T 7/0081 382/131 |
| 2014/0193054 | A1* | 7/2014 | Blaffert | G01R 33/481 382/131 |
| 2015/0003709 | A1* | 1/2015 | Boernert | A61B 6/032 382/131 |

OTHER PUBLICATIONS

Dreyer—Comparison of three image segmentation tech for target volume in PET—Journal of applied clinical medical physics vol. 8-2—spring 2007.*
Gonzalez, R., et al.; Digital Image Processing: Section 10.5 Segmentation by Morphological Watersheds; 2002; Digital Image Processing; 617-626.
Hofmann, M., et al.; MRI-Based Attenuation Correction for PET/MRI: A Novel Approach Combining Pattern Recognition and Atlas Registration; 2008; J. Nuclear Medicine; 49(11)1875-1883.
Hu, Z., et al.; MR-based Attenuation Correction for Whole-body PET/MR System; 2010; IEEE Trans. on Nuclear Science; pp. 2119-2122.
Martinez-Moller, A., et al.; Tissue classification as a potential approach for attenuation correction in whole-body PET/MRI: evaluation with PET/CT data; 2009; J. Nucl. Med.; 50(4)520-526.
Riddell, C., et al.; The Watershed Algorithm: A Method to Segment Noisy PET Transmission Images; 1999; IEEE Trans. on Nuclear Science; 46(3)713-719.
Schulz, V., et al.; Automatic, three-segment, MR-based attenuation correction for whole-body PET/MR data; 2011; Eur. J. Nucl. Med. Mol. Imaging; 38:138-152.
Vincent, L., et al.; Watersheds in Digital Spaces: An Efficient Algorithm Based on Immersion Simulations; 1991; IEEE Trans. on Pattern Analysis and Machine Intelligence; 13(6)583-598.
"Controllable watershed segmentation based on morphological multi-scale gradient", Li Xin et al, Computer Application Research, vol. 25 No. 2, Feb. 2008.

* cited by examiner

APPARATUS FOR GENERATING ASSIGNMENTS BETWEEN IMAGE REGIONS OF AN IMAGE AND ELEMENT CLASSES

CROSS REFERENCE TO RELATED APPLICATIONS

This application is a national filing of PCT application Ser. No. PCT/IB2012/052576, filed May 23, 2012, published as WO 2012/160520 A1 on Nov. 29, 2012, which claims the benefit of U.S. provisional application Ser. No. 61/489,339 filed May 24, 2011 which is incorporated herein by reference.

FIELD OF THE INVENTION

The invention relates to an apparatus, a method and a computer program for generating assignments between image regions of an image of an object and element classes. The invention relates further to a nuclear imaging apparatus, a nuclear imaging method and a nuclear imaging computer program for generating a nuclear image of an object.

BACKGROUND OF THE INVENTION

The article "Towards quantitative PET/MRI: a review of MR-based attenuation correction techniques" by Matthias Hofmann et al., European Journal of Nuclear Medicine and Molecular Imaging, 36 Suppl 1: pages S93 to S104 (2009) discloses a combined positron emission tomography (PET) and magnetic resonance (MR) imaging system, which produces an attenuation map based on a generated MR image acquired by an MR data acquisition unit. The attenuation map is used for reconstructing an attenuation-corrected PET image.

The field of view (FOV) of the MR image can be limited, which may truncate the MR image at the perimeter particularly for larger persons. Moreover, an MR image can be distorted due to, for example, metal implants or ports. These restrictions to the quality of the MR image can also reduce the quality of the attenuation map produced by using the MR image.

SUMMARY OF THE INVENTION

It is regarded as being an object of the present invention to provide an apparatus, a method and a computer program for generating assignments between image regions of an image of an object and element classes, which lead to an improvement of these assignments, in particular, to an improved corresponding attenuation map. It is a further object of the present invention to provide a nuclear imaging system, a nuclear imaging method and a nuclear imaging computer program for generating a nuclear image of the object based on the generated assignments.

In a first aspect of the present invention an apparatus for generating assignments between image regions of an image of an object and element classes is presented, wherein the apparatus comprises:
an object image providing unit for providing an object image of the object,
a segmentation unit for segmenting the object image into image regions,
a feature determination unit for determining features of at least one of a) the image regions and b) boundaries between image regions depending on image values of the object image,
a preliminary element image providing unit for providing a preliminary element image comprising first preliminary assignments between preliminary image regions and element classes, and
an assigning unit for assigning element classes to image regions of an element image of the object, which is indicative of a distribution of the element classes, depending on the determined features and the first preliminary assignments.

Since the assigning unit assigns element classes to image regions of an element image of the object, which is indicative of a distribution of the element classes, depending on the determined features and the preliminary assignments, the resulting element image with the assignments to the element classes is not necessarily based on the provided image only, but can also be based on the preliminary assignments. Thus, if the quality of the assignments defined by the element image would be restricted due to restrictions of the provided object image, these restrictions of the provided image can be compensated by the preliminary assignments such that the quality of the resulting element image can be improved.

The object is preferentially a person or an animal and the element are preferentially at least one of bone, in particular, cortical bone and bone marrow, air, tissue, lung, bowel gas, or other anatomical structures.

The object image providing unit can be an imaging system for providing the object image like an MR imaging system for providing an MR image. The object image providing unit can also be a storing unit, in which the object image is stored already and from which the object image can be retrieved for providing the object image, or a receiving unit for receiving the object image via a wired or wireless data connection and for providing the received object image. The object image providing unit can be adapted to provide an MR image as the object image of the object. An MR image provides anatomical information with a relatively high spatial resolution, thereby allowing producing the attenuation correction map with further improved quality.

In an embodiment, instead or in addition to an MR image also another object image can be used for producing the attenuation correction map. For example, a non-attenuation-corrected (NAC) PET image, in particular, a time-of-flight (TOF) NAC PET image can be used for producing the attenuation correction map.

The assignments can be adapted to assign, for example, labels defining the element classes and/or properties like attenuation values of the element classes to the image regions of the element image. For example, the assigning unit can be adapted to assign firstly labels defining the element classes to the image regions of the element image, wherein then the assigning unit can assign attenuation values to the labels for assigning the attenuation values to the image regions of the element image. However, the assigning unit can also be adapted to directly assign the attenuation values, which are indicative of the respective element classes, to the image regions of the element image. If attenuation values are assigned to the image regions of the elements image, the element image forms an attenuation map, which may, for example, be used for correcting a nuclear image like a PET image.

It is preferred that the segmentation unit is adapted to apply a watershed segmentation to the object image. The watershed segmentation yields a segmentation of the image into image regions, which may correspond to different element classes like different tissue types of the object and which can be used for producing an attenuation map, even if the physical origin of the image is not related to the attenuation of, for example, a PET radiation. Thus, an attenuation map having an improved quality can be produced, even if the physical origin of the image, on which the attenuation map is based, is not related to the attenuation of, for example, PET radiation.

It is further preferred that the apparatus further comprises a differentiation unit for differentiating the object image before applying the watershed segmentation. The differentiation unit can therefore be adapted to produce a gradient image on which the watershed segmentation is applied. Applying the watershed segmentation to the gradient image further improves the quality of the assignments between image regions of the element image of the object and the element classes, in particular, further improves the quality of an attenuation map formed by these assignments. The combination of the differentiation for generating the gradient image and of the watershed segmentation is particularly useful for distinguishing between different element classes like soft tissue, bone, lung, or bowel gas. In another embodiment, the watershed segmentation can also be applied to the provided object image, i.e. not to the gradient image.

In an embodiment, the apparatus further comprises a smoothing unit for smoothing the image, before the watershed segmentation is applied. The smoothing unit can be adapted to smooth the initially provided object image and/or the optionally generated gradient image. Instead or alternatively, other prepossessing steps can be applied to the provided image like truncation of image values to a certain value range or enhancement of edge structures in the image.

The segmentation unit can be adapted to generate watershed lines along high or low image values of the object image for generating the segmented object image. The segmentation can be performed by generating watershed lines along low image values, if, for example, the watershed segmentation is not applied to a gradient image, but to the non-differentiated provided object image. This watershed segmentation based on lines along low image values, which are preferentially gray values, allows improving the quality of distinguishing certain element classes. For example, if the object is a person or an animal, the differentiation between cortical bone and bone marrow can be improved, in particular, in MR images.

A watershed algorithm regards an image as a topographic relief, where the image values are interpreted as altitude in the relief. Generally a watershed algorithm defines watershed lines along "mountain crests" in the relief, i.e. along high image values. If the segmentation unit is adapted to generate watershed lines along low image values, the corresponding watershed algorithm defines watershed lines along valleys in the relief. These watershed lines along low image values can be calculated by modifying a standard watershed algorithm accordingly or by applying a standard watershed algorithm to an inverted image having inverted image values.

Preferentially, the feature determination unit is adapted to determine at least one of i) region features of the image regions being features, which depend on all image values of the respective image region, and ii) boundary features related to boundaries between the image regions, wherein the boundary features depend on at least one of a) region features of neighboring image regions which are separated by a respective boundary and b) image values on the respective boundary.

The feature determination unit can be adapted to determine at least one of the following region features: an average of the image values of the image region, a minimal image value of the image region, a maximal image value of the image region, a standard deviation of the image values within the image region. Moreover, the feature determination unit can be adapted to determine at least one of the following boundary features: an average of the image values on the boundary, a minimal image value of the image values on the boundary, a maximal image value of the image values on the boundary, a standard deviation of the image values on the boundary.

In a preferred embodiment, the preliminary element image providing unit is adapted to provide a preliminary element image being produced based on at least one of the following images: a computed tomography (CT) image, an MR image, a TOF-NAC PET image, a NAC PET image.

It is further preferred that the assigning unit is adapted to determine second preliminary assignments between the image regions and element classes depending on the determined features of the image regions, and combine the first preliminary assignments and the second preliminary assignments for producing combined assignments indicative of a distribution of the element classes. It is also preferred that the assigning unit is adapted to apply at least one of a) predefined assignment rules to the determined features for determining the preliminary second assignments, the assignment rules defining the assignment of element classes depending on the features, and b) predefined combination rules to the first and second preliminary assignments for producing the combined assignments, the combination rules defining assignments of element classes depending on the first and second preliminary assignments.

In an embodiment, the combination rules are adapted such that to an image region the element classes assigned by the second preliminary assignment is assigned, if for the image region at least a second preliminary assignment is present, and that to the image region the element classes assigned by the first preliminary assignment is assigned, if for the image region only a first preliminary assignment is present. Thus, if, for example, the provided object image has a limited transverse FOV, as maybe possible if the provided object image is a CT or an MR image, the element image can have an extended transverse FOV with respect to the provided object image by using the first preliminary assignment, which may relate to a larger transverse FOV covering preliminary image regions, which are not covered by the initially provided object image.

In a preferred embodiment, the combination rules are adapted to be applicable to the first and second preliminary assignments and provided anatomical information of the object, in order to produce the combined assignments depending on the first and second preliminary assignments and the provided anatomical information. The anatomical information can be used to further improve the assignments between the element classes and the image regions of the element image. If, for example, a certain element class has already been assigned to an image region of the element image and if the anatomical information provides information about the element classes in the neighborhood of the certain element class, this anatomical information can be used for determining the assignments in the neighborhood of the image region, to which the certain element class has been assigned already.

The assignment rules and/or the combination rules can be predefined by using calibration measurements, i.e. assignments between element classes and image regions of the element image can be determined based on a provided object image and a provided preliminary element image, while the real assignments between the element classes and the image regions of the element image are known, wherein the rules can be predefined such that the determined assignments meet as good as possible the known real assignments.

In a further aspect of the present invention a nuclear imaging system for generating a nuclear image of an object is presented, wherein the nuclear imaging system comprises:

a nuclear data acquisition unit for acquiring nuclear data, the apparatus for generating assignments between image regions of an object image of an object and element classes as defined in claim 9, a nuclear reconstruction unit for reconstructing a nuclear image based on the nuclear data and the attenuation map.

In a further aspect of the invention a method for generating assignments between image regions of an object image of an object and element classes is presented, the method comprises:

providing an object image of the object, segmenting the object image into image regions, determining features of at least one of a) the image regions and b) boundaries between the image regions depending on image values of the object image, providing a preliminary element image comprising first preliminary assignments between preliminary image regions and element classes, assigning element classes to image regions of an element image of the object, which is indicative of a distribution of the element classes, depending on the determined features and the first preliminary assignments.

In a further aspect of the invention a nuclear imaging method for generating a nuclear image of an object is presented, the nuclear imaging method comprises:

acquiring nuclear data by a nuclear data acquisition unit, assigning element classes to image regions of an element image of the object, which is indicative of a distribution of the element classes, depending on determined features of image regions of an object image of the object and the preliminary assignments as defined in claim 12, assigning attenuation values to the assigned element classes for assigning the attenuation values to the image regions of the image for producing an attenuation map, reconstructing a nuclear image based on the nuclear data and the attenuation map by a nuclear image reconstruction unit.

In a further aspect of the invention a computer program for generating assignments between image regions of an image of an object and element classes is presented, wherein the computer program comprises program code means for causing an apparatus as defined in claim 1 to carry out the steps of the method as defined in claim 12, when the computer program is run on a computer controlling the apparatus.

In a further aspect of the invention a nuclear imaging computer program for generating a nuclear image of an object is presented, wherein the computer program comprises program code means for causing a nuclear imaging system as defined in claim 13 to carry out the steps of the nuclear imaging method as defined in claim 11, when the computer program is run on a computer controlling the nuclear imaging system.

It shall be understood that the apparatus of claim 1, the nuclear imaging system of claim 11, the method of claim 12, the nuclear imaging method of claim 13, the computer program of claim 14 and the nuclear imaging computer program of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
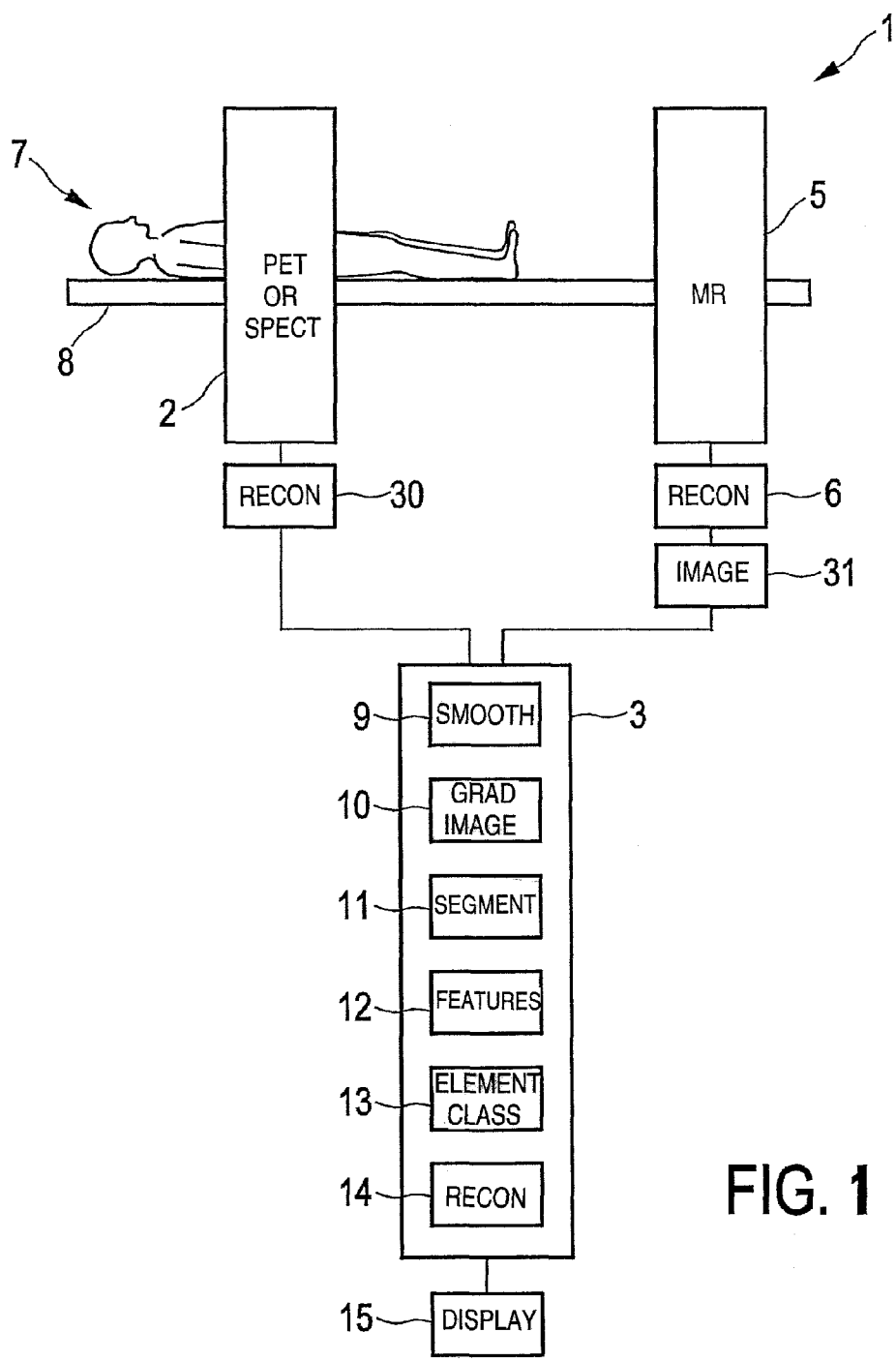
FIG. 1 shows schematically and exemplarily an embodiment of a nuclear imaging system for generating a nuclear image of an object.

FIG. 1 shows schematically and exemplarily a nuclear imaging system for generating a nuclear image of an object 7 having different element classes. In this embodiment, the object 7 is a person lying on a table 8, and the different element classes are, for example, air and different tissue types like bone, lung, soft tissue, et cetera. The element classes can also include different bone element classes, in particular, a cortical bone element class and a bone marrow element class. The nuclear imaging system 1 comprises a nuclear data acquisition unit 2 for acquiring nuclear data. In this embodiment, the nuclear data acquisition unit 2 is adapted for acquiring PET data. However, in another embodiment the nuclear data acquisition unit can also be adapted to acquire other nuclear data like single photon emission computed tomography (SPECT) data.

The nuclear imaging system 1 further comprises a nuclear reconstruction unit 30 for reconstructing a TOF-NAC nuclear image based on nuclear data acquired by the nuclear data acquisition unit 2. The nuclear data acquisition unit 2 and the nuclear image reconstruction unit 30 form an object image providing unit for providing an object image of the person 7, which is, in the embodiment, a TOF-NAC PET image that is schematically and exemplarily shown in FIG. 2.

Figure 3:
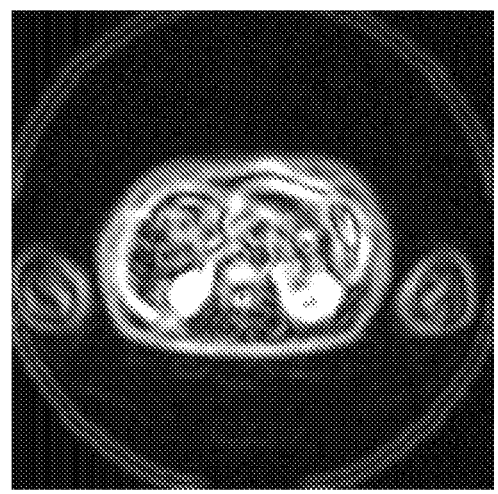
FIG. 3 shows exemplarily a gradient image of the TOF-NAC PET image shown in FIG. 2.
Figure 4:
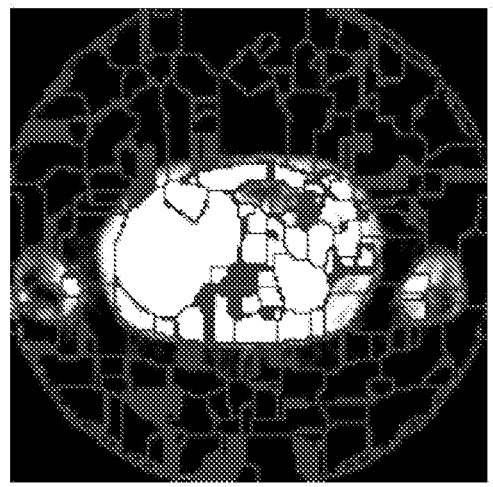
FIG. 4 shows exemplarily a result of a watershed segmentation applied to the gradient image shown in FIG. 3.

The nuclear imaging system 1 further comprises a processing device 3 for processing the TOF-NAC PET image. The processing device 3 comprises a smoothing unit 9 for smoothing the TOF-NAC PET image. In another embodiment, alternatively or in addition, other pre-processing steps can be performed for pre-processing the TOF NAC-PET image. For example, image values of the TOF-NAC PET image can be truncated to a certain value range or edge structures can be enhanced in the TOF-NAC PET image. The processing device 3 further comprises a differentiation unit 10 for differentiating the TOF-NAC PET image for generating a gradient image, which is schematically and exemplarily shown in FIG. 3. Optionally, for the gradient image the absolute value can be calculated and the resulting image can be smoothed by using the smoothing unit 9. The processing device 3 further comprises a segmentation unit 11 for applying a watershed segmentation to the gradient image, in particular, to the absolute values of the gradient image, which may be smoothed, for generating a segmented image comprising image regions, which should be assigned to element classes like different tissue types or air. FIG. 4 shows schematically and exemplarily a resulting segmented image with the watershed lines.

The processing device 3 further comprises a feature determination unit 12 for determining features of the image regions depending on image values of the object image. The feature determination unit 12 is adapted to determine at least one of i) region features of the image region being features which depend on all image values of the respective image region, and ii) boundary features related to boundaries between the image regions, wherein the boundary features depend on at least on of a) region features of labeling image regions which are separated by a respective boundary and b) image values on the respective boundary. Preferentially, the feature determination unit 12 is adapted to determine at least one of the following region features: an average of the image values of the respective image region, a minimal image value of the respective image region, a maximal image value of the respective image region, a standard deviation of the image values within the respective image region. The feature determination unit 12 is preferentially further adapted to determine at least one of the following boundary features: an average of the image values on the respective boundary, a minimal image value of the image values on the respective boundary, a maximal image value of the image values on the respective boundary, a standard deviation of the image values on the respective boundary.

Figure 5:
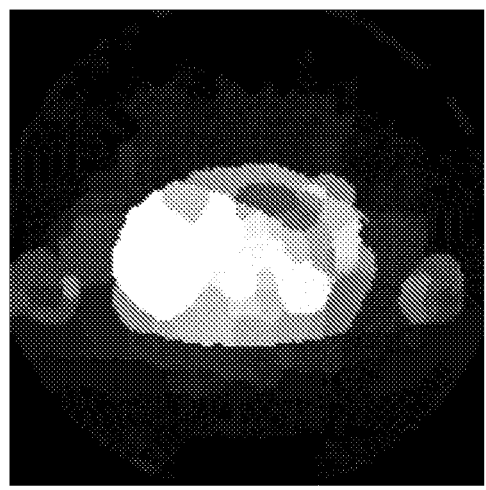
FIG. 5 shows exemplarily an average image value feature image.
Figure 6:
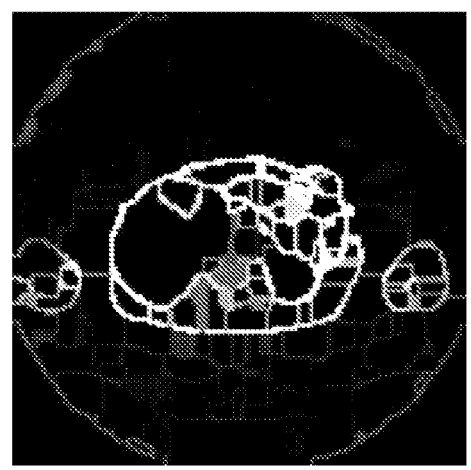
FIG. 6 shows exemplarily a boundary feature image.

FIG. 5 shows exemplarily an average image value feature image, wherein image regions having different average image values, in particular, different average gray values, are shown with different gray values. FIG. 6 shows exemplarily a boundary feature image, wherein in this example the boundary feature is the respective minimal image value of the image values on the respective boundary. In FIG. 6, boundaries having different boundary features are shown with different gray values.

The nuclear imaging system 1 further comprises an MR data acquisition unit 5 for acquiring MR data and an MR reconstruction unit 6 for reconstructing an MR image from the acquired MR data. The nuclear imaging system 1 further comprises a preliminary element image producing unit 31 for producing a preliminary element image comprising first preliminary assignments between preliminary image regions and element classes. In this embodiment, the preliminary element image producing unit 31 is adapted to produce a first preliminary label image as the preliminary element image, wherein image regions of the first preliminary label image, which are assigned to different element classes, are labeled differently. The preliminary element image producing unit 31 can be adapted to perform, for example, tresholding-based segmentation and/or a watershed-based segmentation for producing the preliminary element image. In particular, the preliminary element image producing unit 31 can be adapted to determine a gradient image from the MR image, apply a watershed segmentation to the gradient image and determine features of the resulting image regions and/or of boundaries between the resulting image regions, which can then be used for assigning the labels to the different preliminary regions of the preliminary element image. The MR data acquisition unit 5, the MR reconstruction unit 6 and the preliminary element image producing unit 31 can be regarded as being a preliminary element image providing unit for providing a preliminary element image comprising first preliminary assignments between preliminary image regions and element classes.

In another embodiment, the preliminary element image providing unit can also be adapted to provide a preliminary element image based on another imaging modality like a computed tomography device or an ultrasound imaging device. The preliminary element image providing unit and/or the object image providing unit for providing an object image of the person 7, being, in this embodiment, a TOF-NAC PET image, can also be storing units, in which the preliminary element image and/or the object image, respectively, are stored already and from which the stored preliminary element image and/or the object image, respectively, can be retrieved for providing the preliminary element image and/or object image, respectively. The object image providing unit and/or the preliminary element image providing unit can also be a receiving unit for receiving the respective image from another system and for providing the received preliminary element image and/or object image, respectively.

The processing device 3 further comprises an assigning unit 13 for assigning element classes to image regions of an element image of the person 7, which is indicative of a distribution of the element classes, depending on the determined features and the first preliminary assignments. In this embodiment, the assigning unit 13 is adapted to determine second preliminary assignments between the image regions and element classes depending on the determined features, wherein predefined assignment rules are applied to the determined features for determining the preliminary second assignments. The resulting preliminary second assignments lead to a second preliminary label image, which is schematically and exemplarily shown in FIG. 7.

Figure 7:
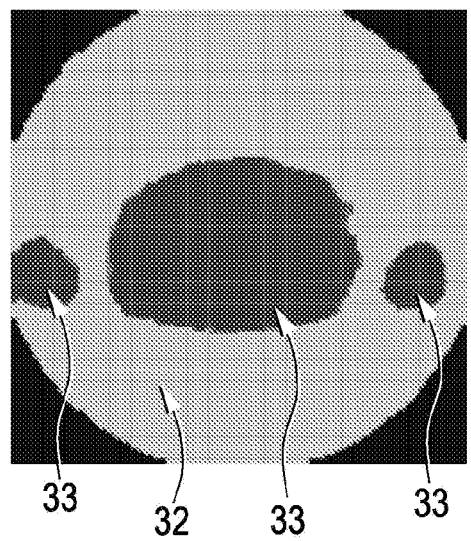
FIG. 7 shows exemplarily a second preliminary label image defining second preliminary assignments between image regions and element classes.

In FIG. 7, reference number 32 denotes air and reference numbers 33 denotes body. Thus, in the example shown in FIG. 7 the second preliminary label image provides a differentiation between body and air.

The assigning unit 13 is further adapted to combine the first preliminary assignments provided by the preliminary element image providing unit and the second preliminary assignments for producing combined assignments indicative of a distribution of the element classes. In this embodiment, the first preliminary assignments determined based on an MR image and the second preliminary assignments determined based on the TOF-NAC PET image are combined for producing combined assignments indicative of a distribution of the element classes. The combined assignments are produced based on predefined combination rules, which are applied to the first and second preliminary assignments. The assigning unit 13 can further be adapted to use combination rules which are configured to be applicable to the first and second preliminary assignments and provided anatomical information of the person 7, in order to determine the combined assignments depending on the first and second preliminary assignments and the provided anatomical information.

The assignment rules and the combination rules are determined by calibration measurements, wherein the combined assignments are determined, while the real assignments are known, wherein the assignment rules and the combination rules are predefined such that the determined assignments meet as good as possible the known assignments.

In an embodiment, two or more element classes can refer to the same element, but to a different probability. For example, a first element class "air" can be assigned to an image region, if it is relatively certain that the respective image region relates to air, and a second element class "possibly air" can be assigned to an image region, if the image region may be air, but if it is not certain, whether the image region really relates to air. For example, several cases with different persons can be studied, and for a certain set of features the percentage of cases, in which the certain set of features correctly indicated air, can be determined. If the determined percentage is larger than a certain threshold, for example, larger than 90%, the respective set of features can be regarded as defining the element class "air", and, if the determined percentage is smaller than the certain threshold but larger than a further second threshold, the respective set of features can be regarded as defining the element class "possibly air".

Correspondingly, the assignment rules can be predefined such that an image region is assigned to the element class "air", if the average image value feature is below a certain first threshold; an image region can be assigned to the element class "possibly air", if the average image value feature is below a certain second threshold that is larger than the first and below a third threshold that is larger than the second threshold; and an image region can be assigned to the element class "possibly tissue", if the average image value is above the third threshold, but below a fourth threshold. Moreover, an image region can be assigned to the element class "tissue", if the average image value feature is above the fourth threshold.

In an example, first preliminary assignments, i.e. a first preliminary label image, are based on an MR image and second preliminary assignments, i.e. a second preliminary label image, are based on a TOF-NAC PET image, wherein, if the element classes are "tissue", "possibly tissue", "air" and "possibly air", the combination rules can be defined such that an image region of an element image is assigned to the element class "tissue", if to this image region the element class "tissue" has been assigned in at least one of the first and second preliminary label images; the element class "tissue" can be assigned to an image region of the element image, if according to both, the first and second preliminary label images, the element class "possibly tissue" has been assigned to the respective image region; and the element class "air" is assigned to an image region of the element image in all other cases.

The combination rules can also be adapted to further consider anatomical information. For example, if the element classes are "air", "possibly air", "tissue" and "possibly tissue" and if the first preliminary assignments, i.e. a first preliminary label image, are based on an MR image and second preliminary assignments, i.e. a second preliminary label image, are based on a TOF-NAC PET image, the combination rules can be defined such that an image region of the element image is assigned to the element class "tissue", if in the first preliminary label image this image region has been assigned to the element class "possibly air", in the second preliminary label image this image region has been assigned to the element class "possibly tissue" and the image region is located at the arm of the person. In order to determine, whether the image region is located at the arm of the person or not, in an embodiment a circle can be fitted to the body contour for approximating the body contour, wherein the image region, to which the element class "possibly tissue" has been assigned by using the second preliminary label image, is regarded as being located at the arm, if this image region is located outside of the circle approximating the body contour. According to a further example of combination rules, if according to a TOF-NAC PET image based preliminary label image an image region is assigned to the element class "possibly tissue" and if this image region is located outside of the MR-field of view, which indicates that this image region relates to truncated arms of the person, the corresponding image region in the element image is assigned to the element class "tissue", wherein in this example it is assumed that a second preliminary label image is based on an MR image.

The assigning unit 13 is further adapted to use the assigned element classes for assigning the attenuation values to the image regions of the element image for producing an attenuation map. In this embodiment, a data base is provided comprising assignments between different element classes like one or different tissue types and air, and attenuation values of the different element classes, wherein the assigning unit is adapted to assign the attenuation values by using the data base. Preferentially, the attenuation values describe the attenuation of air and of the different tissue types for the radiation present in PET imaging. For instance, the attenuation values correspond to an attenuation of radiation having an energy of 511 keV.

The nuclear imaging system 1 comprises a further nuclear image reconstruction unit 14 for reconstructing a nuclear image based on the nuclear data acquired by the nuclear data acquisition unit 2 and the generated attenuation map. In this embodiment, the further nuclear image reconstruction unit 14 is adapted to reconstruct an attenuation-corrected (AC) PET image based on PET data acquired by the nuclear data acquisition unit 2 and the attenuation map. The reconstructed nuclear image is shown on a display 15. The processing device 3 together with the object image providing unit and the preliminary element image providing unit can be regarded as an apparatus for generating assignments between image regions of an image of an object and element classes.

Figure 8:
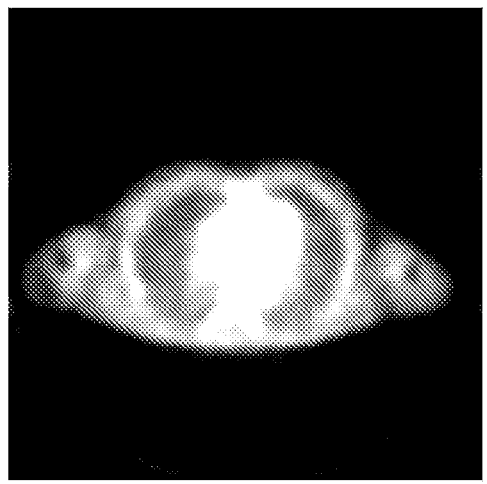
FIG. 8 shows exemplarily a TOF-NAC PET image showing lungs.

FIG. 8 shows schematically and exemplarily a further object image being a TOF-NAC PET image showing the lungs. Also the TOF-NAC PET image shown in FIG. 8 can be provided by the object image providing unit 2, 30.

Figure 9:
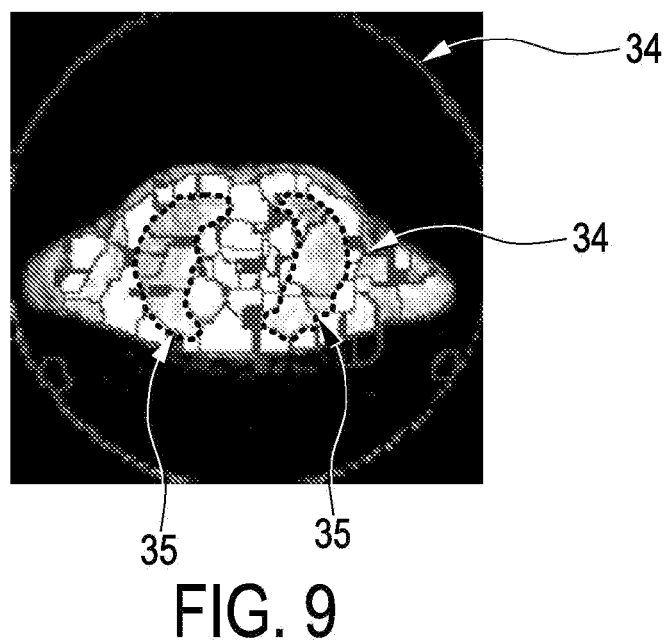
FIG. 9 shows exemplarily watershed lines and segmented lungs.

The TOF-NAC PET image shown in FIG. 8 is smoothed by the smoothing unit 9, differentiated by the differentiation unit 10 for generating a gradient image and segmented by the segmentation unit 11 using a watershed segmentation algorithm for generating a segmented image comprising image regions corresponding to element classes shown in the image. The feature determination unit 12 determines then features of the image regions and/or the boundaries between the image regions depending on image values of the TOF-NAC PET image as described above. The assigning unit 13 determines second preliminary assignments between the image regions and element classes depending on the determined features of the image regions, wherein the determined second preliminary assignments can be combined with the provided first preliminary assignments for producing combined assignments indicative of a distribution of the element classes. FIG. 9 shows schematically and exemplarily watershed lines 34 resulting from the watershed segmentation and lines 35 enclosing the lung of the person 7, i.e. to the image regions enclosed by the lines 35 the element class "lung" has been assigned.

The segmentation unit 11 is preferentially adapted to perform a standard watershed segmentation as disclosed in, for example, the article "Watersheds in Digital Spaces: An Efficient Algorithm Based on Immersion Simulations" by L. Vincent and P. Soille, IEEE Trans. Pattern Anal. Machine Intell., 13(6), 583-598 (1991), which is herewith incorporated by reference. The segmentation unit 11 can be adapted to generate watershed lines along high or low image values of the respective provided image for generating the segmented image, and it can be adapted to segment a differentiated gradient image and/or a non-differentiated image.

A watershed algorithm regards an image as a topographic relief, where the image values are interpreted as altitude in the relief. Generally a watershed algorithm defines watershed lines along "mountain crests" in the relief, i.e. along high image values. If the segmentation unit is adapted to generate watershed lines along low image values, the corresponding watershed algorithm defines watershed lines along valleys in the relief. These watershed lines along low image values can be calculated by modifying a standard watershed algorithm accordingly or by applying a standard watershed algorithm to an inverted image having inverted image values.

Figure 10:
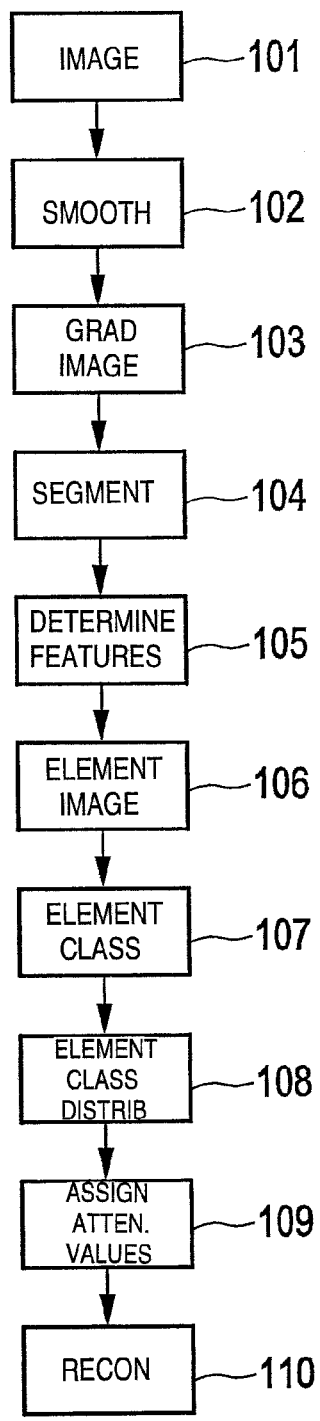
FIG. 10 shows a flowchart exemplarily illustrating an embodiment of a method for generating assignments between image regions of an image of an object and element classes.

In the following a method for generating assignments between image regions of an object image of an object and element classes will exemplarily be described with reference to a flowchart shown in FIG. 10.

In step 101, the object image providing unit 2, 30 provides an object image of the person 7. In particular, the nuclear data acquisition unit 2 acquires PET data and the nuclear reconstruction unit 30 reconstructs a TOF-NAC PET image.

In step 102, the smoothing unit 9 smoothes the TOF-NAC PET image and, in step 103, the differentiation unit 10 differentiates the smoothed TOF-NAC PET image, calculates the absolute value of the gradient and optionally smoothes the calculated absolute values for generating a gradient image. In step 104, the segmentation unit 11 applies a watershed segmentation to the gradient image for generating a segmented image comprising image regions corresponding to element classes, in particular, corresponding to, for example, soft tissue, bone, right lung, left lung, bowel gas, air, et cetera. In step 105, the feature determination unit 12 determines features of the image regions and/or of the boundaries between the image regions depending on image values of the segmented image and, in step 106, the preliminary element image providing unit 5, 6, 31 provides a preliminary element image comprising first preliminary assignments between preliminary image regions and element classes. In particular, a corresponding preliminary label image is provided, wherein the different element classes are indicated by different labels, by using a preliminary element image producing unit, which produces a preliminary element image depending on, in this embodiment, an MR image reconstructed by the MR reconstruction unit 6 from MR data acquired by the MR data acquisition unit 5.

In step 107, the assigning unit 13 determines second preliminary assignments between the image regions and element classes depending on the determined features, i.e., in this embodiment, depending on the determined features of the image regions, which have been generated by applying the watershed segmentation to the TOF-NAC PET image. In step 108, the first preliminary assignments and the second preliminary assignments are combined by the assigning unit 13 for producing combined assignments indicative of a distribution of the element classes. In particular, predefined combination rules are applied to the first and second preliminary assignments for producing the combined assignments. In step 109, the assigning unit 13 assigns attenuation values to the assigned element classes the attenuation values to the image regions of the element image for producing an attenuation map. In step 110, the nuclear image reconstruction unit 14 reconstructs an AC PET image based on the acquired PET data and the attenuation map.

Figure 11:
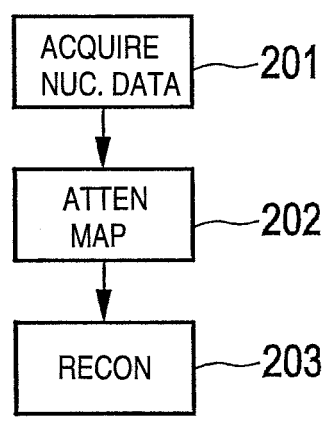
FIG. 11 shows a flowchart exemplarily illustrating an embodiment of a nuclear imaging method for generating a nuclear image of an object.

FIG. 11 shows a flowchart exemplarily illustrating an embodiment of a nuclear imaging method for generating a nuclear image of an object.

In step 201, nuclear data are acquired by the nuclear data acquisition unit 2. In this embodiment, PET data are acquired by the nuclear data acquisition unit 2. In step 202, an attenuation map is determined as described above with reference to steps 102 to 109 and, in step 203, the nuclear image reconstruction unit 14 reconstructs a nuclear image, in this embodiment, an AC PET image, based on the nuclear data and the attenuation map.

The apparatus and method for generating assignments between image regions of an image of an object and element classes use, in the described embodiment, a general image segmentation procedure for segmenting TOF-NAC PET images. The apparatus and method are preferentially adapted to separate image regions that contain anatomical structures with relevant attenuation values in order to improve image quality in PET reconstruction.

Figure 2:
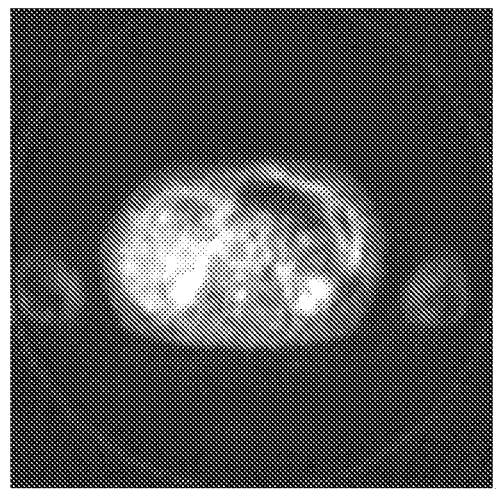
FIG. 2 shows exemplarily a TOF-NAC PET image.

FIG. 2 shows a typical TOF-NAC PET image. A straight-forward image segmentation approach such as an application of an intensity threshold might fail, because the intensity of TOF-NAC PET images can vary over slices or slices may show stronger scatter that cannot be distinguished from low intensity tissue values. Moreover, TOF-NAC PET images do not show known absolute intensity values like CT images. An intensity threshold would therefore be needed to be determined individually for each TOF-NAC PET image.

The apparatus and method for generating assignments between image regions of an image of an object and element classes are preferentially adapted to overcome the problem of image segmentation under varying or unknown pixel intensities by calculating a gradient image of the TOF-NAC PET image (FIG. 3) and applying a watershed transform to the gradient image (FIG. 4). Areas relevant for the particular purpose of attenuation map generation can be identified by using predefined rules, i.e. by heuristics over region and/or boundary features and, in particular, relations to neighboring regions. The apparatus and method can be adapted to distinguish between different body structures like the lung and other tissue as shown in FIG. 9.

Figure 12:
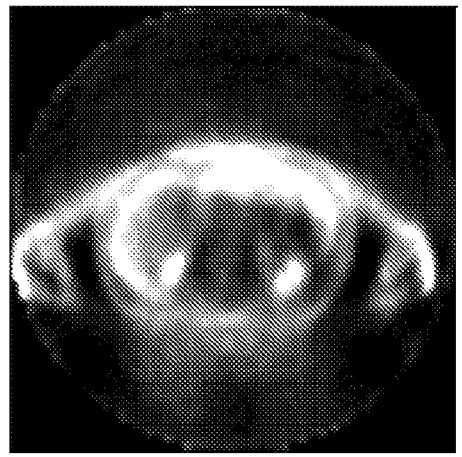
FIG. 12 shows exemplarily a NAC PET image.

Although in the above described embodiments the provided object image is preferentially a TOF-NAC PET image, in other embodiments the provided object image can also be another image like a NAC PET image or an MR image. In particular, the object image providing unit can be adapted to provide a NAC PET image as the object image of the person 7. For example, the nuclear data acquisition unit 2 can be adapted to acquire PET data and the nuclear reconstruction unit 30 can be adapted to reconstruct a NAC PET image, i.e., a PET image, which has been reconstructed without considering attenuation information and without considering TOF information. Such a NAC PET image is schematically and exemplarily shown in FIG. 12.

Figure 13:
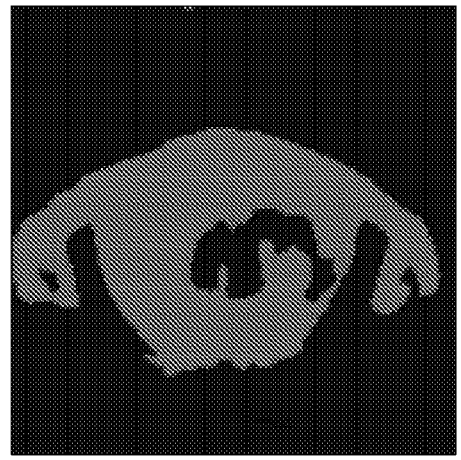
FIG. 13 shows exemplarily the result of a threshold-based image segmentation procedure applied to the NAC PET image shown in FIG. 12.
Figure 14:
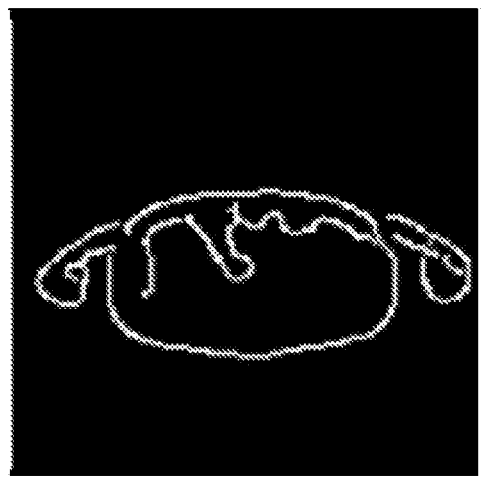
FIG. 14 shows the result of applying an edge detection filter to the NAC PET image shown in FIG. 12.

A straight-forward image segmentation approach for segmenting the NAC PET image could be the application of an intensity threshold. A possible resulting image is schematically and exemplarily shown in FIG. 13. However, the application of an intensity threshold often fails, because NAC PET images typically show contours which are similar to a convex hull of the person's geometry, not allowing a differentiation of neighboring structures like body and arms. Moreover, intensities of image values of a NAC PET image have unknown and varying height. Generally, also a "Canny edge" filter that more robustly detects edges could be applied to the NAC PET image. A corresponding resulting image is schematically and exemplarily shown in FIG. 14. The application of a "Canny edge" filter has the disadvantage that detected edges often do not join into closed contours and thus the edge is needed to be somehow extrapolated by additional post-processing in order to define the enclosed regions.

Figure 15:
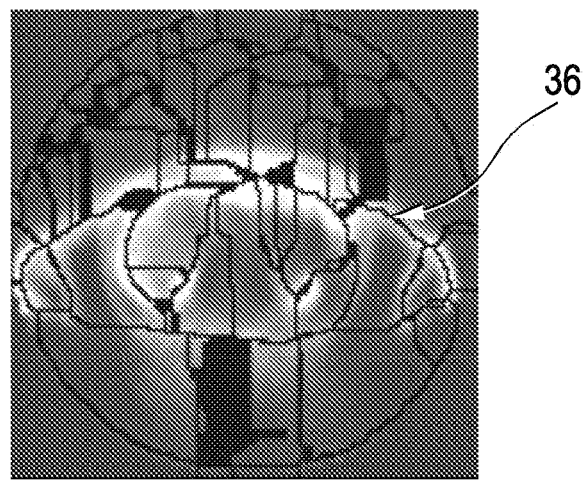
FIG. 15 shows exemplarily watershed lines resulting from a watershed segmentation applied to the image shown in FIG. 12.
Figure 16:
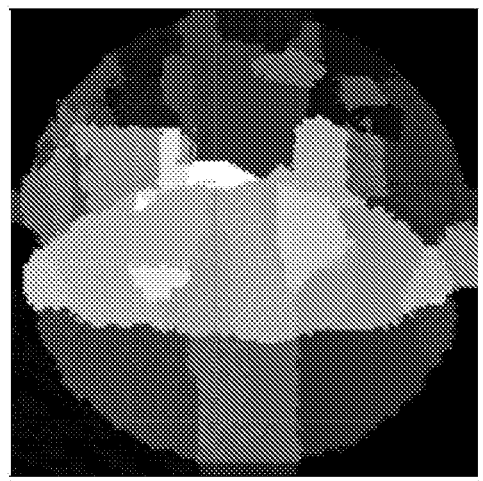
FIG. 16 shows exemplarily an average image value feature image.
Figure 17:
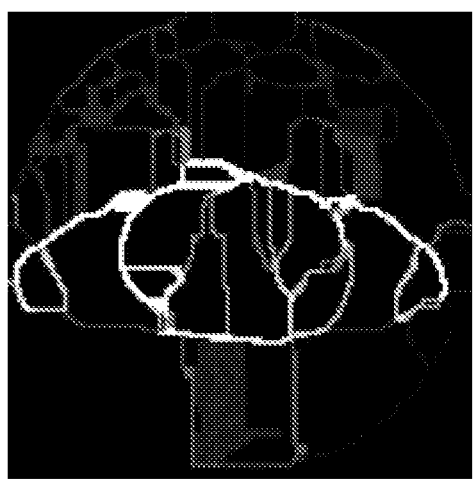
FIG. 17 shows exemplarily a boundary feature image.

The apparatus and method for generating assignments between image regions of an image of an object and element classes can be adapted to overcome the problem of incomplete contours by applying a watershed segmentation, i.e. a watershed transform, to the NAC PET image. Thus, in an embodiment the segmentation unit 11 is adapted to segment the NAC PET image into image regions by applying a watershed transform. A resulting image with watershed lines 36 is schematically and exemplarily shown in FIG. 15. Areas relevant for the particular purpose of attenuation map generation can be identified by heuristics over region and/or boundary features, in particular, in relation to neighboring regions. Thus, the object image providing unit can be adapted to provide a NAC PET image, wherein the smoothing unit can be adapted to smooth the provided NAC PET image and to optionally perform further pre-processing steps on the NAC PET image. The segmentation unit can then segment the NAC PET image into smaller regions by applying the watershed algorithm. In this embodiment, a gradient image is not generated before applying the watershed algorithm. Then, the feature determination unit can determine region and/or boundary features as described above. For instance, for each image region an average of the image values of the respective image region can be determined resulting in an average image value feature image as schematically and exemplarily shown in FIG. 16, in which image regions having different averages are shown with different gray values. FIG. 17 shows exemplarily and schematically a boundary feature image, wherein boundaries having different minimal image values are shown with different gray values.

Figure 18:
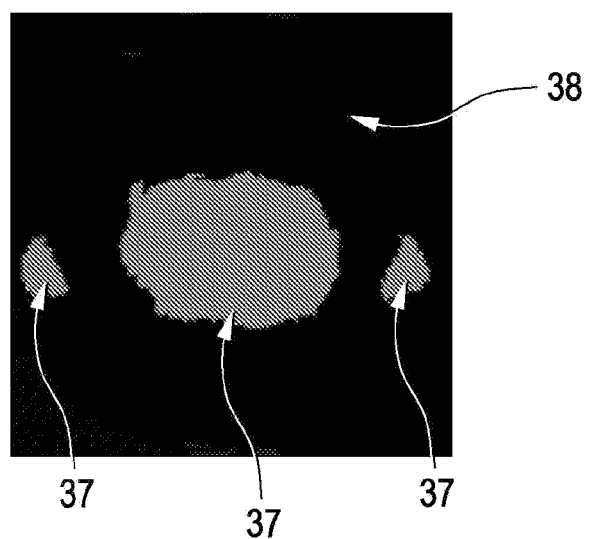
FIG. 18 shows exemplarily a second preliminary label image defining second preliminary assignments between image regions and element classes depending on the determined features of the image regions.

The assigning unit then determines second preliminary assignments between the image regions and element classes depending on the determined features. In particular, image regions are labeled such that they are assigned to air or body by reasoning over the determined features. Preferentially, assignment rules are applied to the determined features for performing the assignment procedure. In this embodiment, the assignment rules are determined for features of a NAC PET image, wherein these assignment rules can be determined by calibration measurements, wherein the features are determined based on a NAC PET image and wherein the distribution of the element classes, in particular, of air and tissue, in the NAC PET image is known and wherein the assignment rules are predefined such that the assignments, which result from the application of the assignment rules to the determined features, meet as good as possible the known assignments of the image regions to the element classes. A resulting image is schematically and exemplarily shown in FIG. 18. In FIG. 18, reference number 37 denotes tissue and reference number 38 denotes air.

The second preliminary assignments, i.e., in this embodiment, the second preliminary label image, provide tissue and air labels as indicated in FIG. 18, which are combined with first preliminary assignments between preliminary image regions and element classes provided by the preliminary element image providing unit for producing combined assignments indicative of a distribution of the element classes.

The first preliminary assignments can be based on at least one of the following images: a CT image, an MR image, a NAC PET image and a TOF-NAC PET image. Thus, in an embodiment first preliminary assignments can be based on at least one of a NAC PET image and a TOF-NAC PET image and second preliminary assignments can be based on the other of the NAC PET image and the TOF-NAC PET image. In other words, both preliminary assignments can be produced based on the same acquired PET data.

Also in this embodiment, the assigning unit can be adapted to assign attenuation values to the assigned element classes for assigning the attenuation values to the image regions of the element image for producing an attenuation map, and the nuclear image reconstruction unit can be adapted to reconstruct an AC PET image based on the acquired PET data and the attenuation map.

For providing preliminary assignments based on an MR image, a provided MR image is preferentially smoothed, differentiated for generating a gradient image and segmented by applying a watershed segmentation to the gradient image. Region and/or boundary features are then preferentially determined, wherein the determined features are used for generating the preliminary assignments by applying corresponding assignment rules to the determined features. In an embodiment, the watershed segmentation can also be applied to a non-differentiated MR image for segmenting the MR image.

PET scanners are generally provided in combination with a CT scanner as PET/CT system. In contrast, a combined PET/MR system has the advantage of no extra radiation dose and better soft tissue contrast. Moreover, a combined PET/MR system may be adapted to simultaneously acquire PET data and MR data.

A combined PET/CT system and a combined PET/MR system also provide more accurate information about anatomical structures than single PET systems, and radiation attenuation properties can be derived for different body areas, in particular, attenuation maps can be derived from a CT image or an MR image, respectively. For PET/CT systems the attenuation coefficients are a function of the Hounsfield values. In case of PET/MR systems the attenuation map is obtained by more sophisticated image processing, for example, by image segmentation into different tissue classes like muscle, fat, bone, lungs, et cetera and inserting standard attenuation values for each tissue class, i.e. for different element classes.

A restriction in the use of CT and MR images for deriving attenuation maps is the limited transverse FOV, which may truncate the CT image or MR image, respectively, at the perimeter particularly for larger persons. This restriction is more severe in an MR image, since the transverse FOV is usually smaller than in a CT system, mainly due to the signal deterioration near the border of the reconstruction FOV. Also, in some cases CT or MR images are distorted due to, for example, metal implants or ports, which make a correct derivation of attenuation values impossible for some image regions. If an incorrect attenuation map, which is derived from a truncated or otherwise distorted CT image or MR image, is used for reconstructing an AC PET image, the reconstructed AC PET image will become inaccurate and/or may contain artifacts.

The apparatus and method for generating assignments between image regions of an image of an object and element classes can be adapted to overcome the problem of inaccurate PET images due to incorrect attenuation maps obtained from incomplete or distorted CT or MR images by combining them with one or more PET images that have been reconstructed without utilizing attenuation information, in particular, by combining them with a NAC PET image, which does not include TOF information, and/or with a TOF-NAC PET image, which includes TOF information. The NAC PET image and/or the TOF-NAC PET image shows usually anatomical structures, which are missing in the CT image or the MR image. A NAC PET image and a TOF-NAC PET image can contain different anatomical details and may therefore together be used and combined with the CT or MR image. The apparatus or method for generating assignments between image regions of an image of an object and element classes are preferentially adapted to combine the CT or MR image with at least one of a NAC PET image and a TOF-NAC PET image by segmenting the respective images and merging the segmented respective images. For example, the apparatus and method can be adapted to replace incorrect air/tissue assignments in an MR label image with labels derived from a NAC PET image or a TOF-NAC PET image. The attenuation map is then preferentially derived from the merged resulting label image.

Thus, in an embodiment the apparatus and method for generating assignments between image regions of an image of an object and element classes can be adapted to firstly create a NAC PET image and/or a TOF-NAC PET image, wherein then the NAC PET image and/or the TOF-NAC PET image are segmented. Features are determined for the resulting segmented image regions of the NAC PET image and/or the TOF-NAC PET image and/or boundaries between the image regions, and based on the determined features at least either air or tissue is assigned to each image element, in particular, each pixel or voxel, of the respective image region with, if possible, a differentiation of tissue types such as lung tissue. These assignments form the second preliminary assignments. Moreover, a CT image or an MR image can be provided, segmented into image regions and the resulting segmented image regions can be assigned to at least either air or tissue such that each image element has been assigned to at least either air or tissue, wherein, if possible, a further differentiation of different tissue types may be provided such as lung tissue. These assignments form the first preliminary assignments which define first and second preliminary label images, which were produced based on a) CT or MR images, and b) NAC PET or TOF-NAC PET images.

The first preliminary label image, which corresponds to the first preliminary assignments, has generally another size and resolution than the second preliminary label image, which is produced based on a NAC PET image or a TOF-NAC PET image. The assigning unit can therefore be adapted to re-format the first preliminary label image and, thus, the first preliminary assignments, to the size and resolution of the second preliminary label image and, thus, to the size and resolution of the second preliminary assignments.

The first and second preliminary assignments can be combined for producing combined assignments indicative of a distribution of the element classes by merging labels from the first preliminary label image with the labels from the second preliminary label image into a multi-source label image, i.e. into an element image of the person, which is indicative of a distribution of the element classes like soft tissue, lung, muscle, fat, bone, air, et cetera. A more advanced reasoning can include prior knowledge about anatomical structure, i.e. anatomical information, as described above.

The assigning unit is then preferentially further adapted to assign suitable attenuation values in accordance with the labels to the image regions for generating a multi-source attenuation map. If the first preliminary assignments are based on a CT image, for image regions of the multi-source attenuation map labeled in accordance with the first preliminary assignments, the attenuation values, which are assigned to these image regions, are preferentially attenuation values obtained directly from the intensity values of the initial CT image. The multi-source attenuation map is preferentially used by the nuclear image reconstruction unit for reconstructing an AC PET image.

The apparatus and method for generating assignments between image regions of an object and element classes can be adapted for PET/CT imaging, particularly in cases where the object under scanning is too big to be accurately reconstructed in CT. The apparatus and method can also be adapted for PET/MR imaging, particularly in cases where parts of the object close to the MR reconstruction FOV are not visible, and the apparatus and method can be adapted for PET/CT or PET/MR imaging where parts of the image contain artifacts, for example, due to metal implants that distort accurate attenuation map generation.

Although in embodiments described above, first and second preliminary assignments between preliminary image regions and element classes, i.e. two corresponding first and second preliminary label images, have been combined for generating an element image, in other embodiments also more than two preliminary assignments, i.e. more than two preliminary label images, can be combined for generating the final combined element image.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Calculations like the smoothing operation, the differentiation, the segmentation, the feature determination, the assignment procedures, the combination of first and second preliminary assignments, in particular, the combination of first and second preliminary label images, et cetera performed by one or several units or devices can be performed by any other number of units or devices. For example, steps 102 to 109 can be performed by a single unit or by any other number of different units. The calculation and assigning procedures and/or the control of the apparatus for generating assignments between image regions of an image of an object and element classes in accordance with the method for generating assignments between image regions of an image of an object and element classes and/or the control of the nuclear imaging system in accordance with the nuclear imaging method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to an apparatus for generating assignments between image regions of an image of an object and element classes. The apparatus comprises an assigning unit for assigning element classes to image regions of an element image of the object, which is indicative of a distribution of the element classes, depending on region and/or boundary features, which are determined depending on image values of a provided object image and provided first preliminary assignments. Thus, the resulting element image with the assignments to the element classes is not necessarily based on the provided object image only, but can also be based on the provided preliminary assignments. If the quality of the assignments defined by the element image would be restricted due to restrictions of the provided object image, these restrictions of the provided image can therefore be compensated by the preliminary assignments such that the quality of the resulting element image can be improved.

The invention claimed is:

1. A nuclear imaging apparatus comprising:
a processor configured to:
  receive a time-of-flight non-attenuation-corrected positron emission tomography image and a magnetic resonance image,
  differentiate the time-of-flight non-attenuation-corrected positron emission tomography image to generate a gradient time-of-flight non-attenuation-corrected positron emission tomography image,
  differentiate the magnetic resonance image to generate a gradient magnetic resonance image,
  segment the gradient time-of-flight non-attenuation-corrected positron emission tomography image using a watershed algorithm to generate boundaries which distinguish between image regions and applying the boundaries to the time-of-flight non-attenuation-corrected positron emission tomography image, each region representing a class of tissue,
  segment the gradient magnetic resonance image using a watershed algorithm to generate boundaries which distinguish between image regions and applying the boundaries to the magnetic resonance image, each region representing a class of tissue,
  assign tissue classes to the image regions of the magnetic resonance image,
  assign tissue classes and probabilities to the image regions of the segmented time-of-flight non-attenuation-corrected positron emission tomography image based on the tissue classes of the image regions of the time-of-flight non-attenuation-corrected positron emission tomography image and the tissue classes and probabilities of the segmented time-of-flight non-attenuation-corrected positron emission tomography image,
  determine attenuation values for each image region and generating and storing an attenuation map,
  reconstruct non-attenuation-corrected position emission data using the attenuation map to generate an attenuation-corrected position emission tomographic image.

2. The apparatus as defined in claim 1, wherein the tissue values assigned to the image regions of the PET image include tissue, air, and probability of tissue or air.

3. The apparatus as defined in claim 1, wherein the attenuation values are determined for radiation of 511 keV and the non-attenuation-corrected PET image data is time-of-flight non-attenuation corrected positron emission data.

4. An apparatus for generating an attenuation map, the apparatus comprising:
one or more processors configured to:
  reconstruct a time-of-flight non-attenuation-corrected positron emission tomography (TOF-NAC-PET) image of a subject from time-of-flight positron emission data,
  generate a gradient image by differentiating the TOF-NAC-PET image such that each voxel for the image represents a slope,
  segment the gradient image using a watershed algorithm to generate boundaries to distinguish between image regions with the TOF-NAC-PET image, each region representing a class of tissue,
  receive a preliminary tissue class image which has been segmented to generate preliminary boundaries and preliminary image regions, the preliminary image regions each identifying a preliminary tissue class,
  assigning attenuation values to the image regions of the TOF-NAC-PET image based on tissue classification rates and the preliminary tissue classes for producing the attenuation map.

5. The apparatus as defined in claim 4, wherein the processor is further configured to:
  determine second preliminary assignments between the image regions and tissue classes depending on the determined features of the image regions,
  combine the first preliminary assignments and the second preliminary assignments for producing combined assignments indicative of a distribution of the tissue classes.

6. The apparatus as defined in claim 5, wherein the assigning unit is adapted to apply at least one of a) predefined assignment rules to the determined features for determining the preliminary second assignments, the assignment rules defining the assignment of element classes depending on the features, and b) predefined combination rules to the first and second preliminary assignments for producing the combined assignments, the combination rules defining assignments of tissue classes depending on the first and second preliminary assignments.

7. The apparatus as defined in claim 6, wherein the combination rules are adapted to be applicable to the first and second preliminary assignments and provided anatomical information of the object, in order to produce the combined assignments depending on the first and second preliminary assignments and the provided anatomical information.

8. The apparatus as defined in claim 4, wherein the the processor is further configured to:
  reconstruct a time-of-flight attenuation-corrected positron emission tomography image based on the time-of-flight positron emission data and the attenuation map.

9. A nuclear imaging system for generating an image of a subject, the nuclear imaging system comprising:
  a time-of-flight PET scanner configured to acquire the time-of-flight positron emission data,
  the apparatus as defined in claim 8 configured to produce the attenuation map,
  a reconstruction processor configured to use the attenuation map in reconstructing the acquired time-of-flight positron emission data into an attenuation-corrected time-of-flight positron emission tomographic image,
  a display device configured to display the time-of-flight attenuation-corrected positron emission tomographic image.

10. The apparatus as defined in claim 4, wherein determining the preliminary tissue class includes determining average image values of the image regions, minimal image values of the image regions, maximal image values of the image regions, a standard deviation of the image values of the image regions, average image values along the boundaries, minimal image values along the boundaries, maximal image values along the boundaries, and a standard deviation of image values along the boundaries.

11. The apparatus as defined in claim 4, wherein the image regions of the segmented time-of-flight non-attenuation-corrected PET image differentiates between body tissue and air.

12. The apparatus as defined in claim 4, wherein the class of tissues represented by the image regions of the time-of-flight non-attenuation-corrected PET image include tissue, possibility of tissue, air, and possibility of air.

13. A method for generating assignments between image regions of an object image of an object and element classes, the method comprising:
    providing a time-of-flight non-attenuation corrected positron emission tomography image as an object image of the object,
    differentiating the object image to generate a gradient image,
    segmenting the gradient image into image regions by applying a watershed segmentation to define boundaries between the image regions,
    determining features of a) the image regions and b) the boundaries between the image regions based on image values of the object image,
    providing a preliminary element image comprising first preliminary assignments of preliminary image regions and tissue classes of each preliminary image region,
    assigning tissue classes to image regions of an object image, which is indicative of a distribution of the tissue classes, based on the determined features and the first preliminary assignments,
    assigning attenuation values to the image regions based on the assigned tissue classes to generate an attenuation map,
    reconstructing positron emission data into an attenuation-corrected positron emission tomographic image using the attenuation map.

14. A nuclear imaging method for generating a nuclear image of an object, the nuclear imaging method comprising:
    acquiring nuclear data by a nuclear data scanner,
    reconstructing the attenuation-corrected positron emission tomographic image with the steps as defined in claim 13,
    displaying the attenuation-corrected positron emission tomographic image on a display device.

15. The method as defined by claim 13, wherein determining the preliminary tissue class includes determining average image values of the image regions, minimal image values of the image regions, maximal image values of the image regions, a standard deviation of the image values of the image regions, average image values along the boundaries, minimal image values along the boundaries, maximal image values along the boundaries, and a standard deviation of image values along the boundaries.

16. The method as defined by claim 13, wherein the image regions of the segmented time-of-flight non-attenuation-corrected PET image differentiates between body tissue and air.

17. The method as defined by claim 13, wherein the class of tissues represented by the image regions of the time-of-flight non-attenuation-corrected PET image include tissue, possibility of tissue, air, and possibility of air.

18. A non-transitory computer-readable medium carrying software for controlling one or more processors to perform the method according to claim 13.

* * * * *